H. Van Dewater,
Water Wheel.
No. 33,220. Patented Sep. 3, 1861.
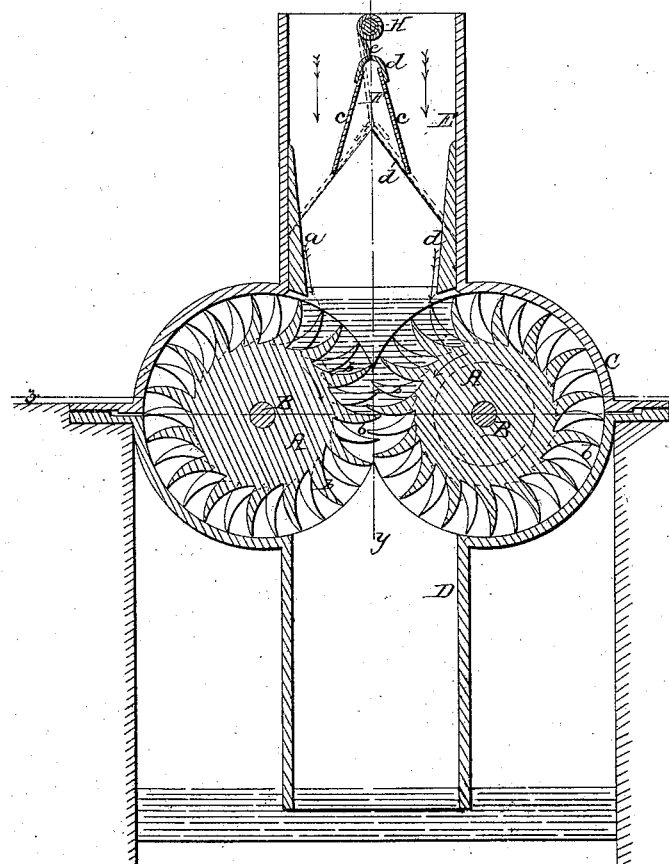
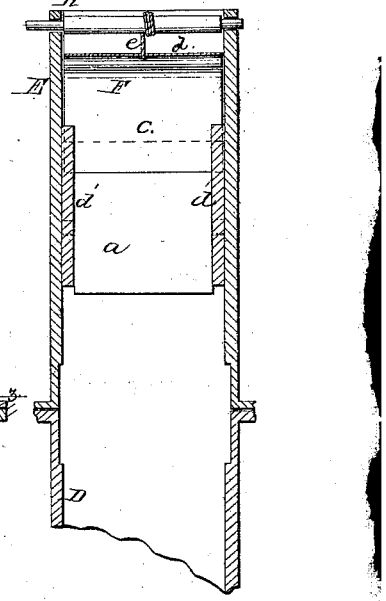
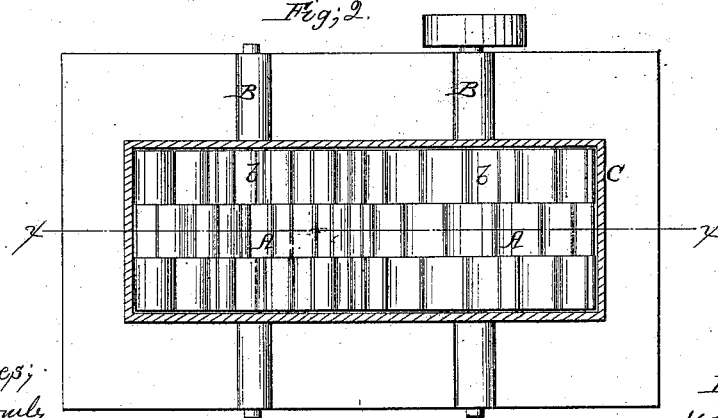
Witnesses:
J W Coomly
W. Tusch
Inventor:
H. Van Dewater
by Munn & Co
atty.

UNITED STATES PATENT OFFICE.

HENRY VAN DEWATER, OF WEEDSPORT, NEW YORK.

IMPROVED WATER-WHEEL.

Specification forming part of Letters Patent No. 33,220, dated September 3, 1861.

*To all whom it may concern:*

Be it known that I, HENRY VAN DEWATER, of Weedsport, in the county of Cayuga and State of New York, have invented a new and Improved Water-Wheel; and I do hereby declare that the following is a full, clear, and exact description of the same, reference being had to the annexed drawings, making a part of this specification, in which—

Figure 1 is a vertical central section of my invention, taken in the line $x\ x$, Fig. 2. Fig. 2 is a horizontal section of the same, taken in the line $y\ y$, Fig. 1. Fig. 3 is a vertical section of the same, taken in the line $z\ z$, Fig. 1.

Similar letters of reference indicate corresponding parts in the several figures.

The invention relates to an improvement in that class of water-wheels which are provided with draft-tubes for the purpose of obtaining a twofold action of the water—first, gravity, and, second, suction.

The invention consists in the employment or use of two water-wheels, the buckets of which interlock or mesh into each other, and are arranged with a draft-tube and gate, as hereinafter described, whereby it is believed that a good or large percentage of the power of the water is obtained by a very simple and economical arrangement of parts.

To enable those skilled in the art to fully understand and construct my invention, I will proceed to describe it.

A A represent two water-wheels, which are placed on horizontal shafts B B and inclosed in a suitable case C, the lower part of which communicates with a vertical tube D, commonly termed a "draft-tube," the upper part of the case communicating with a tube E, which contains a gate F. The two tubes D E are in line with each other, of quadrilateral form and equal in diameter; but the tube E has inclined plates $a\ a$ in it at the opposite sides, which plate serves to deflect the water properly on the buckets of the wheels A A.

The buckets $b$ are of curved form, as shown in Fig. 1, the concave surfaces receiving the water, and each wheel is provided with three rows of buckets, the center row being in line with the centers of the spaces between the buckets of the two adjoining rows, as shown plainly in Fig. 2. The buckets of the two wheels gear into each other, like the teeth of cogged wheels, and hence both wheels are positively or arbitrarily connected, both moving or operating simultaneously, the power being taken from either wheel.

The gate F is constructed of two planes $c\ c$, connected at their upper ends by a joint $d$, which may be of leather or other suitable flexible material. The planes $c\ c$ extend across the whole width of the tube E, and they rest or bear on V-shaped guides $d'\ d'$ at opposite sides of the tube E. The gate F is connected by a rope or chain $e$ with a windlass H on top of tube E, and it will be seen that as the gate is raised the planes $c\ c$ will approach each other and admit more water into tube E. When the gate is fully lowered and closed, the lower ends of the planes $c\ c$ are in contact with the inclined plates $a\ a$. It is designed to have the gate F secured at any desired height, according to the volume of water that is required to act upon the wheels A A.

By having the gate F arranged as described the water is admitted equally on the two wheels A A, as the movement of the two planes $c\ c$ will be precisely alike, the gravity of the planes in connection with the guides $d'\ d'$ and the raising and lowering movements affecting the result.

The water acts upon the buckets $b$ with a force due to its gravity, while the tube D, in consequence of having its lower end immersed in the "tail water," produces the suction or draw, as usual. By having the buckets $b$ of concave form the descending column of water is not broken, as would be the case to a greater or less extent were radial buckets employed. The two wheels, arranged as shown, admit of a quick speed, so that the power may be taken direct from one of the wheel-shafts, intermediate gearing which would be required to get up speed with a single large wheel of proportionate power being avoided and consequently much power saved.

I do not claim, separately, the employment or use of the draft-tube D, for that has been previously used; but I do claim as new and desire to secure by Letters Patent—

1. The two wheels A A, having their buckets $b$ interlocked or geared into each other, in combination with the draft-tube D, substantially as and for the purpose set forth.

2. The gate F, formed of two planes $c\ c$, resting on V-shaped guides $d'\ d'$, connected by a joint $d$, and attached to a windlass H, all arranged as and for the purpose set forth.

HENRY VAN DEWATER.

Witnesses
F. G. DAY,
E. A. HUDSON.